Jan. 10, 1956
J. RABINOW
2,730,654
AUTOMATIC HEADLIGHT DIMMER INSENSITIVE
TO ORDINARY LIGHTS
Filed Oct. 21, 1952
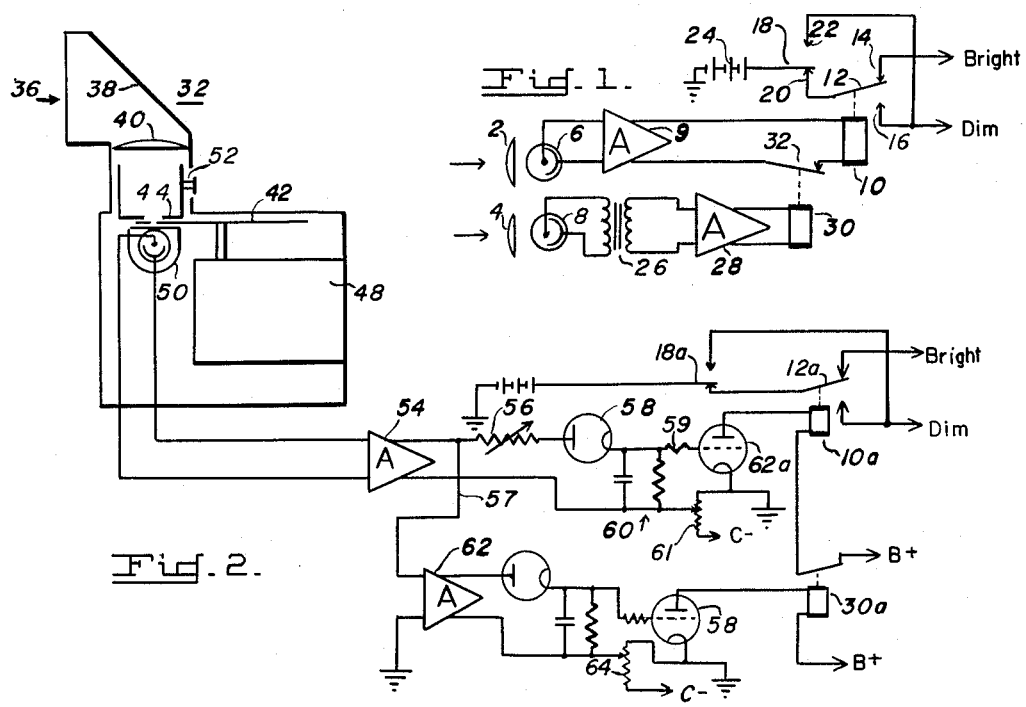
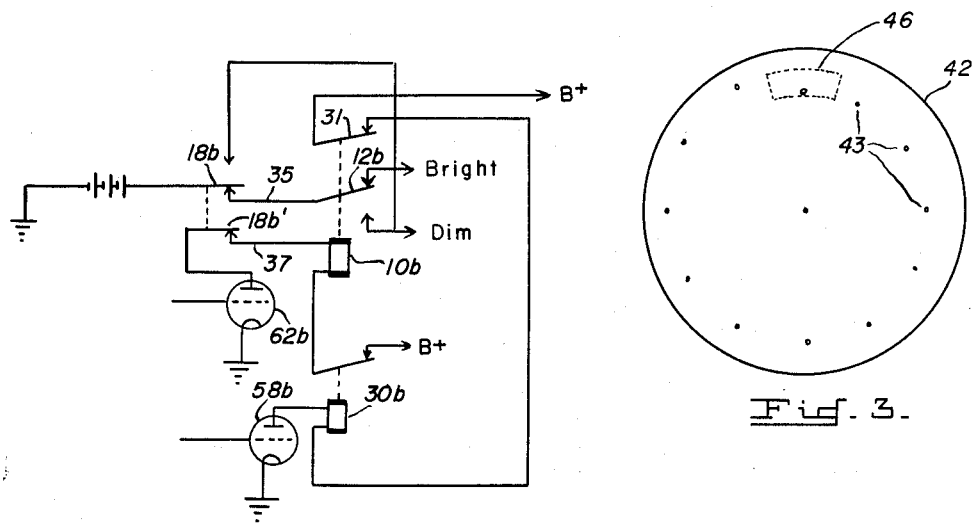
INVENTOR
*JACOB RABINOW*
BY *Max L. Libman*
ATTORNEY United States Patent Office 2,730,654
Patented Jan. 10, 1956

2,730,654

AUTOMATIC HEADLIGHT DIMMER INSENSITIVE TO ORDINARY LIGHTS

Jacob Rabinow, Takoma Park, Md.

Application October 21, 1952, Serial No. 315,897

4 Claims. (Cl. 315—83)

This invention relates to automatic headlight dimmers, and has for its principal object the provision of an improved dimmer which causes automatic dimming of the headlights of a vehicle upon detection of light from an oncoming headlight, but which will not cause dimming action due to an equally bright light which does not come from the headlight of a vehicle, but which is produced by a light source such as a street light, the lights from the ordinary lamp bulb shining from the window of a house or a porch, etc.

It will be apparent that it is desired to dim the headlight of a vehicle when the headlights of an oncoming vehicle come into view at a predetermined distance or with a predetermined intensity. The purpose of this is, of course, to prevent one's own headlights from dazzling the driver of the oncoming vehicle. However, there are many circumstances where the fixed lights from a road illuminating lamp or even from a house which happens to be in the field of view are of sufficient intensity to normally cause actuation of an automatic headlight dimming device. It will be obvious that there is no need to dim one's own headlights under these circumstances. Automatic headlight dimmers are known, usually employing a photoelectric cell or its equivalent, which will dim the headlights of a vehicle in which they are mounted when the received light from a predetermined viewing area in advance of the vehicle exceeds a predetermind limit. In an earlier-filed U. S. patent application, Serial No. 285,581, May 1, 1952, now Patent No. 2,632,040, I have described an automatic headlight dimmer which operates on the principle of comparing the light received from a predetermined portion of the field of vision with the average intensity of light received from the overall field of vision and actuating a headlight dimmer when the difference exceeds a predetermined amount. This system has obvious advantages over conventional headlight dimmers of the previously described type, but it also will be actuated by a street or house lamp of the same intensity, even though there is no need for dimming if this is the only source in the field of view.

It is a primary object of this invention to provide means, applicable to both the conventional, previously known, headlight dimming system and to my above-mentioned improved dimming system, for rendering the automatic dimming means sensitive to the light from an oncoming automobile or other vehicle, but not to the light from a street lamp, house, etc. I accomplish this by taking advantage of the fact the later class of lights is, in this country, practically universally energized by an alternating current supply source. While the usual frequency is sufficiently high to effectively smooth out the light to the eye of the observer, so that he is not ordinarily aware of any flicker, yet there is also a substantial pulsating component of light intensity due to the alternating current peaks. In the case of a 60-cycle supply source, these pulsations will occur, of course, at 120 cycles per second, since there is one for each half-wave of the supply current. I take advantage of this effect by providing, in conjunction with the previously known types of headlight dimmers, an inhibiting circuit responsive only to light pulsations of this frequency. This inhibiting circuit is utilized to prevent normal dimming actuation if the light received has a sufficiently large pulsating 120-cycle component. The vehicle headlights are, of course, supplied by a D.-C. source and so do not exhibit these fluctuations. The inhibiting system is therefore not effective if the received illumination which actuates the normal automatic dimmer system comes from an automobile headlight.

The specific nature of the invention, as well as other advantages thereof, will clearly appear in a description of a preferred embodiment as shown in the accompanying drawings, in which:

Fig. 1 is a schematic diagram showing the basic principle of the invention;

Fig. 2 is a schematic diagram and circuit drawing of a system embodying my invention;

Fig. 3 is a view of a portion of the scanning disc of Fig. 2 showing the relationship between the light apertures and the masking element;

Fig. 4 is a circuit diagram of a modification of the invention.

Referring to Fig. 1, the light from the desired field of view is caused, by suitable means, to pass through collecting lenses 2 and 4 and to fall on photocells 6 and 8 respectively. Both of these lenses are arranged so that their field of view is substantially the same, that is, they are responsive to light from the same area in advance of the vehicle whose headlights are to be dimmed. Light from photocell 6 is amplified by a suitable D.-C. amplifier 9 the output of which, when the signal is sufficiently strong actuates relay 10 and causes the switch 12 to move from the condition shown, wherein the switch engages contact 14, thereby energizing the bright light, to the alternative position, wherein switch 12 engages contact 16, thus energizing the dim lights and causing the desired dimming action. This is the basic automatic dimming action, well known in the art. A manual switch 18 is provided which is more customarily in practice a foot operated switch, which enables manual dimming to be exercised at any time by operating switch 18 so as to engage contact 22 instead of contact 20 as shown, thereby energizing the dim lights regardless of the operation of the relay 10, as will be apparent from inspection of the circuit. The usual automobile storage battery is shown at 24.

Light which falls upon photocell 8 is passed through transformer 26 to alternating current amplifier 28. It will be apparent that no D.-C. component of the signal produced by light falling upon photocell 8 will be amplified by this system, but any A.-C. component will, of course, be amplified. The output of amplifier 28 is fed to relay 30. Relay 30 is therefore operated whenever there is a substantial A.-C. component in the light which falls upon photocell 8, and, of course, in the light which falls upon photocell 6, since both cells are subjected to the same field of illumination. Relay 30 is made faster acting than relay 10. This may be readily accomplished by various expedients known to those skilled in the art. Because relay 30 is faster acting it will, when energized, operate switch 32 to open the circuit of relay 10, thereby disabling the operation of the latter before it can become effective. Thus, if there is any substantial A.-C. component in the received illumination, the system is rendered ineffective to dim the headlights in response to this illumination. On the other hand, if the illumination which falls upon the photocell comes from the headlight of another automobile, since automobiles are universally powered by D.-C. batteries, and therefore contain no A.-C. pulsating component in their illumination, while the D.-C. circuit will operate as before, the A.-C. circuit 4 through 28 will now not be actuated. The switch 32 will therefore remain closed and the dimming action will be produced as desired. It will be apparent that this system will not operate if a predetermined portion of the illumination is derived from an alternating current source. It is true that under conditions where there is light received from both an oncoming vehicle headlight and from adjacent street lamps which happen to be in the field of view, if the street lamps are sufficiently strong, then dimming will not occur even though it might be desirable to dim under such circumstances. In that event the operator of the vehicle may still use the foot dimming switch as heretofore, so that he is no worse off than before. However, the circuit can readily be so adjusted that this will normally not occur except under conditions where the overall illumination external to the vehicle is so high that it is less important to dim the headlights than in the case where the headlights are the only bright object in an otherwise completely dark field of view.

The above automatic dimming system is basically very unsophisticated and open to various objections. A more sophisticated system which overcomes most of these objections is disclosed in my earlier filed patent application, Serial No. 285,581. This dimming system may also be improved by means of my present invention, by rendering it also insensitive to alternating current powered illumination, as will be explained below.

Referring to Fig. 2, the optical part of the system indicated generally at 32, may be exactly the same as shown in my above-referred to earlier filed application Serial No. 285,581. However, for a purpose later to be explained, instead of rotating the scanning disc at a speed of 30 R. P. S., which was suggested by way of example in the earlier filed application, I prefer to use a speed of 45 R. P. S. The optical part of the system is contained in the housing 34, the general dimensions being in the order of 4 x 4 x 6 inches. Light enters at 36, is reflected by mirror 38 to lens 40 and focussed upon scanning disc 42 through masking member 44, which masks the observed field to a rectangular area as indicated at 46 in Fig. 3, this representing the desired field of view. This field of view would generally correspond to the field of illumination produced by the headlights of the vehicle on which this device is mounted. The scanning disc is continually rotated by means of motor 48 at a speed, for example of 45 R. P. S. This motor may either be a conventional small electric motor drawing a negligible current, or a pneumatic motor powered by the automobile engine. The motor may be so connected in the headlight switch circuit that it runs continually when the headlights are on, or it may be controlled by the manual overriding switch described below so that it is cut out when the headlights are under manual control and the automatic dimmer is not in operation.

The scanning disc is provided with a spiral row of apertures 43 as shown in Fig. 3, somewhat like the Nipkow scanning disc originally used in early television. I prefer to have only one aperture in the field at one time so that light will be received by the photocell 12 from only one discrete area at a time. Any light which passes through the apertures in the scanning disc falls upon the photocell, or other suitable light-sensitive device 50.

It will be noted that the masking aperture can be moved forward and away from the lens 40 by means of adjusting member 52. This aperture is preferably moved into a position sufficiently out of the focal plane of the lens 40 so that the image of the edges of the aperture is not sharp, but is "fuzzy." In this way, any light from the small apertures 43 of the scanning disc appears on the image gradually rather than suddenly and similarly fades out at the opposite edge of the masking aperture. Since the spacing of adjacent apertures 43 is made exactly equal to the width of the masking aperture, this means that the light from one opening 43 fades in as the light from the next opening fades out so that the average intensity of illumination from a constant background remains constant and sudden transients are not produced by the appearance and disappearance of the apertures from the area representing the field of vision. The same effect could, of course, be produced by other means, for example, by a "gray area" at the edges of the masking aperture of increasing opacity from the aperture toward the edges, but the defocussing means shown is simpler and permits a certain amount of control of the edge fading.

The apertures 43 may be actual perforations if the disc 42 is made of opaque material, or the disc may be of transparent material with a printed or photographed coating having optical apertures in the form of transparent portions. Since the scanning disc rotates in a typical case at 45 R. P. S., the electrical output pattern of the cell will be repeated at this rate, and can therefore be amplified directly without further modulation. A suitable circuit arrangement for this purpose is shown in Fig. 2.

The output of the photocell is first amplified by conventional means, indicated at 54, and then is passed through a variable resistance 56 to a rectifier 58. The rectified output is passed through a network 60, comprising a peak detector of conventional arrangements, the constants of which are selected so that the variations in received intensity corresponding to the variations in light intensity of the ordinary field of view (when there is no headlight of an oncoming vehicle therein) will not produce sufficient output at the grid of amplifier tube 62 to energize the relay 10a. The light of an oncoming headlight is so much more intense than this background that there is easily sufficient difference between the two so that the relay 10a can be made to operate on the large peaks produced by even the dimmed headlights of an oncoming car, but not on the small peaks produced by any other light which would normally come into the filed of view. Even at dusk, when there is still a large amount of total light in the sky, by the time it becomes necessary to turn on the headlights, the sky light from an area as small as the one being scanned is still much less intense than that received from oncoming headlights, so that there is an ample margin or difference on which to operate.

Relay 10a controls the operation of the headlight dimming circuit as shown, the switch 12a being normally biased to "bright" position, but made to dim whenever the relay is actuated. These circuit elements correspond exactly to relay 10 and switch 12 respectively of Fig. 1, and the rest of the dimming circuit is the same as in Fig. 1.

Relay 10a is preferably of the type which requires less current to hold than to initially energize it, which is normally the case in any event. This characteristic is desirable to prevent oscillation or flickering of the headlights in the situation where the photocell is actuated by an oncoming light at the extreme distance or by the weakest oncoming light to which it will respond. In that case, if the oncoming car's light are also dimmed (whether by a similar automatic system or manually), then the light from the oncoming car would now be below the minimum intensity to which the system would respond, and the relay would release, causing the lights to return to bright. If both cars are equipped with automatic systems, a condition of oscillation or flickering might be set up which would be highly disagreeable. By making the relay one which requires less current to hold than to initially operate, this possibility is prevented.

In Fig. 2, the function of resistance 56 is to provide a small delay, which can be controlled, in the time the headlights are dimmed so as to retard the time of initiation of dimming. This is to insure that at the extreme range of operation of two cars equipped with my invention each one will have time to be effected by the headlights of the other before the dimming action takes place, otherwise the more sensitive one would be dimmed considerably before the other one. The resistance is made adjustable so that this delay can be adjusted to suit the circumstances of operation as required. Resistance 59 is to prevent large grid current in case of very large signals.

The above described operation is substantially identical with that described in my previously filed application, Serial No. 285,581. However, the present invention includes the inhibiting circuit which will now be described.

Coupled to the ungrounded side of amplifier 54 through lead 57 is a second amplifier 62, which is tuned to 120 cycles or in the case where disc 42 rotates at 45 R. P. S. it may be preferable to tune amplifier 62 to a suitable difference frequency between 120 cycles and 45 cycles, such as 15 cycles, due to the chopping effect of the apertures in the scanning disc, since both 120 cycle and 15 cycle components will be present. Therefore, if there is a sufficiently strong 120 cycle component in the output of amplifier 54, which will be the case if the received light is coming from a light source which is powered by a 60-cycle supply, then the input to the second amplifier 62 will contain a strong 120-cycle component. This amplifier is sharply tuned to pass only 120 cycles. This amplifier A.-C. output, when it exists, will actuate fast-acting relay 30a, corresponding to relay 30 of Fig. 1, which therefore inhibits the operation of the slower relay 10a of the normal dimming system. Therefore, the action of the normal dimming system will be inhibited. Of course, if an appreciable 120-cycle component does not exist, then no inhibition will occur and normal dimming action will be provided as is desired.

While I show a tuned amplifier 62, it will be apparent that if sufficient power is available at the output of amplifier 54, no further amplification will be needed, and a non-amplifying filter tuned to pass 120 cycles will serve in place of tuned amplifier 62.

By providing respective adjustable bias regulators 61 and 64 for tubes 58 and 62a, the sensitivity of the two circuits may be adjusted to suit individual circumstances. It will be obvious that instead of this electrical adjustment, a mechanical one may be used on the relays. The arrangement shown is illustrattive and may be modified in various ways. For example, instead of two separate photocells in the arrangement of Fig. 1, a single photocell could be employed as in Fig. 2, with tuned amplifier 28 connected to the ouput of amplifier 9, similar to the arrangement of Fig. 2.

Another modification is illustrated in Fig. 4, which is generally similar to Fig. 2, except that one of the leads to relay 30b, corresponding to relay 30a in Fig. 2, is brought out as shown to a second switch 31 actuated by relay 10b so that when the headlights are in the "bright" position as shown, the circuit to relay 30b is closed, but when the headlights are in the "dim" position, the circuit to relay 30b is opened. This permits the same type of action as before in the usual case when light from an A.-C. powered source falls on the photocell 50, that is, relay 30b will act faster than relay 10b to open switch 32b, and inhibit dimming action. However, in the case where dimming has occurred due to an oncoming headlight, and the two vehicles are still approaching each other, it would be very undesirable if a street light at this time comes into the field of view, to suddenly shine the bright lights into the face of the oncoming driver, yet this might occasionally occur with the arrangement of Fig. 2, since the presence of a sufficiently strong pulsating component at any time would cause relay 30a to operate. The arrangement of Fig. 4 may be used if desired to obviate this possibility. If relay 10b has operated first to cause dimming, then the circuit of 30b is opened and the dimmed condition remains until the vehicles have passed. The possibility does exist that after they have passed, the presence of a street light in the field of view will cause the dimmed condition to persist because the large steady component of light from the ordinary filament lamp, even on alternating current, will be sufficient to maintain relay 10b actuated. However, this condition will be only momentary—as soon as the A.-C. powered light disappears from the field of view, even momentarily, normal operation will be resumed. Furthermore, a second set of contacts may be added, if desired, to switch 18b as shown at 18b', whereby normal operation can be imposed by twice operating the foot dimmer switch which is what the driver would tend to do in any event if he wished to change the existing condition, and produced no effect the first time he operated the switch. This is due to leads 35 and 37, controlled by foot switch 18b, so that when the foot switch is moved to the dimming position, the circuit of relay 10b is broken whereupon its armature returns to its normal "bright" position, although dimming still continues due to foot switch 18 being in its upper position; however, when the footswitch 18 is again operated to bring it back to its lower, or normally "bright" position, normal operation will be resumed.

No arrangement is shown whereby the foot or manual switch can override operation of the dimming action in the face of a bright oncoming headlight; this is not usually considered desirable. However, if it were desired to add such a feature, it is obvious that it could be done. I refer to switch 18 (or 18a) as a foot or manual switch since it is obvious that either could be used. Of course, in modern automobile practice the "manual" control is almost universally a foot operated stepping switch which is alternately switched to each of two different positions by successive actuations.

It will, of course, be equally obvious that the alternating current part of the system need not be supplied from the same photocell as the basic dimming system in the arrangement of Fig. 2. Instead, the tuned A.-C. amplifier 62 could be supplied from a separate photocell as shown in Fig. 1, this cell being arranged to be illuminated by the same field of view as the dimming photocell. For example, the mirror 38 could be half-silvered, so that only half of the light is reflected to the photocell 50, the other half passing directly through the mirror to a second independent photocell so that the latter will be illuminated by the same general field of view as the former. The output of this second photocell will then be fed directly to the 120-cycle amplifier 62, as shown in connection with Fig. 1, and the operation of the system will otherwise be exactly the same.

It will also be apparent that the details of the motor drive for the scanning disc may be varied to suit the circumstances. Not only may the motor be either electrical or mechanical, but an electric motor, where one is used, may be a D.-C. motor driven from the battery or an A.-C. motor driven from the same power supply as is used for the electronic circuit, since the D.-C. from the battery is conventionally converted to A.-C. for the purpose of voltage transformation in the power supply, and this would enable the simplest possible type motor to be used, while maintaining constant speed.

It will be apparent that the embodiments shown are only exemplary and that various modifications can be made in construction and arrangement within the scope of my invention as defined in the appended claims.

I claim:

1. An automatic headlight dimming system comprising means for admitting light from a selected field of view, a photoelectrically controlled light-dimming circuit sensitive to a steady component of said admitted light for automatically dimming the headlights of a vehicle, and means responsive to a regularly fluctuating component of light from said field of view for inhibiting action of said dimming circuit.

2. An automatic head light dimmer comprising an optical system for producing an image of a desired portion of a field of vision including any light source which may be in said field of view, means for scanning said image, light-responsive means for converting the light from the scanned portion of said image into an electrical output, a light-dimming circuit controlled by said electrical output, further means responsive to a regular pulsating component in the light from such source which may appear in said scanned portion to produce a voltage output, and means actuated by said voltage output for inhibiting the action of said light dimming circuit.

3. The invention recited in the preceding claim, said further responsive means being sensitive only to such regularly pulsating component when the latter is above a predetermined intensity.

4. An automatic headlight dimming system comprising means for admitting light from a selected field of view; photoelectric means for converting said admitted light into an electric signal; means for periodically scanning said field of view at a cyclic rate non-harmonic with a predetermined standard A.-C. power frequency to continuously admit light from different discrete areas thereof to said photoelectric means, said last means comprising a scanning disc; an amplifier for amplifying the output of said photoelectric means to produce an amplified signal output in response to fluctuations in received illumination intensity from various points in said field of view; a peak detector for detecting said amplified signal output, an amplifier for amplifying the output of the peak detector; means to regulate the sensitivity of said amplifier, a relay actuated by the output of the amplifier for causing dimming of the headlights of an automobile when said relay is actuated; and means for inhibiting the action of said relay comprising a filter connected to the output of said first amplifier, said filter being tuned to twice said standard A.-C. power frequency non-harmonic with the periodic scanning rate of said scanning means, and a second relay controlled by the output of said filter for inhibiting the action of said first relay, said second relay being faster acting than said first relay.

References Cited in the file of this patent

UNITED STATES PATENTS

| | | |
|---|---|---|
| 2,184,743 | Horton | Dec. 26, 1939 |
| 2,295,000 | Morse | Sept. 8, 1942 |
| 2,423,278 | Willis | July 1, 1947 |